(12) United States Patent
Girotto

(10) Patent No.: US 10,486,524 B2
(45) Date of Patent: Nov. 26, 2019

(54) TRACTION AND SUSPENSION SYSTEM

(71) Applicant: TEXA DYNAMICS S.R.L., Monastier di Treviso (TV) (IT)

(72) Inventor: Adriano Girotto, Spresiano (IT)

(73) Assignee: TEXA DYNAMICS S.R.L., Monastier di Treviso (TV) (IT)

(*) Notice: Subject to any disclaimer, the term of this patent is extended or adjusted under 35 U.S.C. 154(b) by 341 days.

(21) Appl. No.: 15/301,961

(22) PCT Filed: Apr. 7, 2015

(86) PCT No.: PCT/IB2015/052488
§ 371 (c)(1),
(2) Date: Oct. 5, 2016

(87) PCT Pub. No.: WO2015/155670
PCT Pub. Date: Oct. 15, 2015

(65) Prior Publication Data
US 2017/0182879 A1    Jun. 29, 2017

(30) Foreign Application Priority Data
Apr. 9, 2014 (IT) .............................. TV2014A0055

(51) Int. Cl.
*B60K 7/00* (2006.01)
*B60G 3/20* (2006.01)
(Continued)

(52) U.S. Cl.
CPC .............. *B60K 7/0007* (2013.01); *B60G 3/20* (2013.01); *B60G 17/0165* (2013.01); *H02K 1/182* (2013.01); *H02K 16/00* (2013.01); *B60G 2200/144* (2013.01); *B60G 2204/30* (2013.01); *B60G 2300/50* (2013.01); *B60G 2401/17* (2013.01); *B60K 2001/006* (2013.01); *B60K 2007/003* (2013.01);
(Continued)

(58) Field of Classification Search
CPC ............ B60K 7/0007; B60K 2007/003; B60K 2001/006; B60K 2007/0038; B60K 2007/0053; B60K 2007/0069; B60K 2007/0092; B60G 3/20; B60G 17/0165; B60G 2200/144; B60G 2204/30; B60G 2300/50; B60G 2401/17; H02K 16/00
USPC ........................................................ 310/67 R
See application file for complete search history.

(56) References Cited

U.S. PATENT DOCUMENTS 6,293,561 B1 * 9/2001 Goetzen .................... B60G 3/01
                                                    280/5.5
2014/0354102 A1 * 12/2014 Post ....................... H02K 1/182
                                                    310/156.34

FOREIGN PATENT DOCUMENTS

CA    2942561 A1 * 9/2015 ............... H02K 3/28
DE   10007658 A1   10/2001
(Continued)

*Primary Examiner* — Forrest M Phillips
(74) *Attorney, Agent, or Firm* — Mark M. Friedman

(57) ABSTRACT

A suspension system (20) is described for vehicle with a frame, comprising an element (R, 12) propulsive by rolling on the ground; two units (12a, 12b) adapted to impart a torque to the propulsive element that are controllable independently of one another, where the two units are movable relative to the propulsive element independently from one another and rigidly connectable to the frame at one same point (P). By moving one or each unit relative to the propulsive element the distance between the latter and said point is made to vary.

11 Claims, 4 Drawing Sheets

(51) Int. Cl.
*B60G 17/0165* (2006.01)
*H02K 1/18* (2006.01)
*H02K 16/00* (2006.01)
*B60K 1/00* (2006.01)

(52) U.S. Cl.
CPC ............... *B60K 2007/0038* (2013.01); *B60K 2007/0053* (2013.01); *B60K 2007/0069* (2013.01); *B60K 2007/0092* (2013.01)

(56) References Cited

FOREIGN PATENT DOCUMENTS

| | | | |
|---|---|---|---|
| JP | 2008114745 A | 5/2008 | |
| WO | WO-2004054069 A1 * | 6/2004 | ............ H02K 1/145 |
| WO | 00/38939 A1 | 7/2007 | |

* cited by examiner

Fig. 5
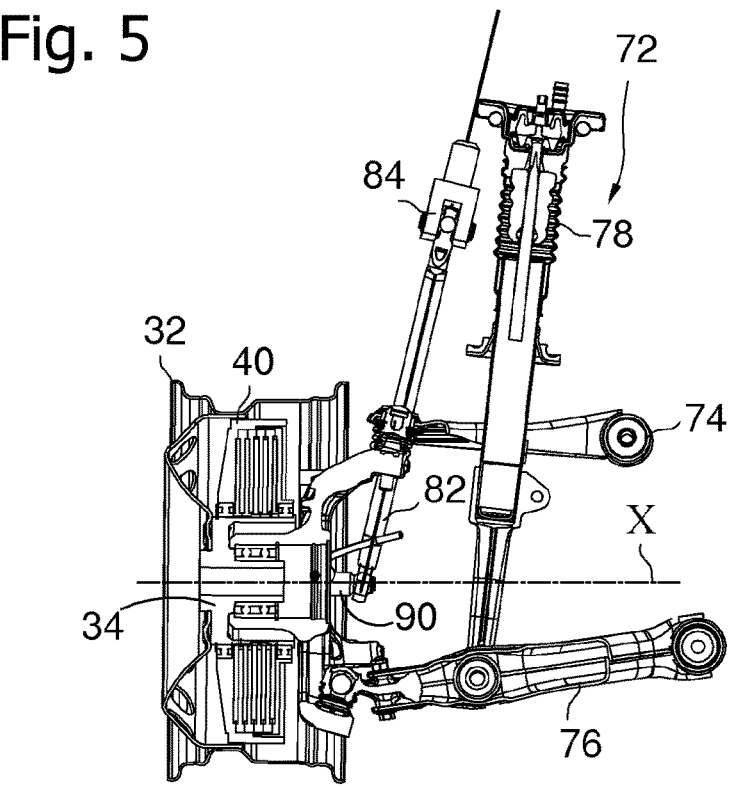
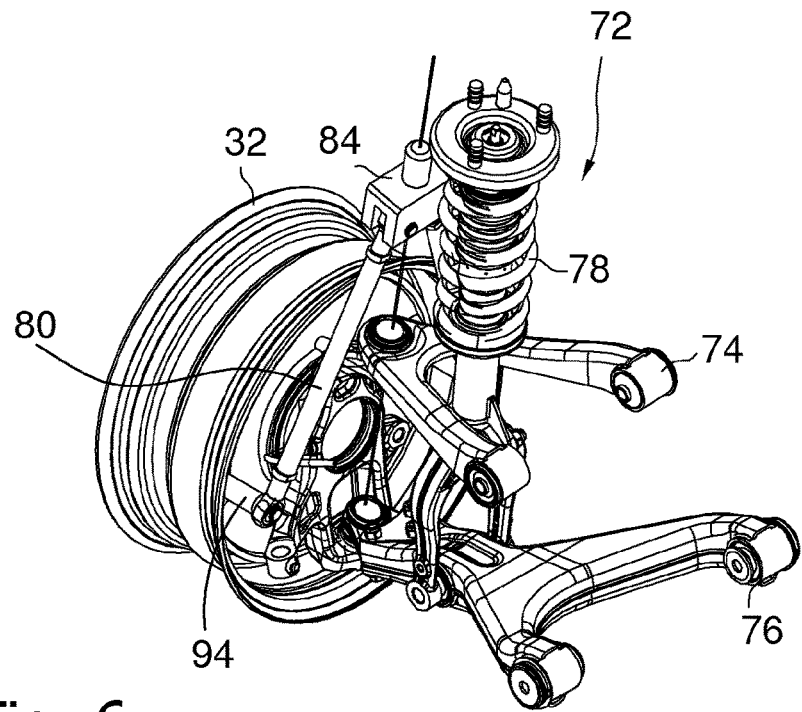
Fig. 6

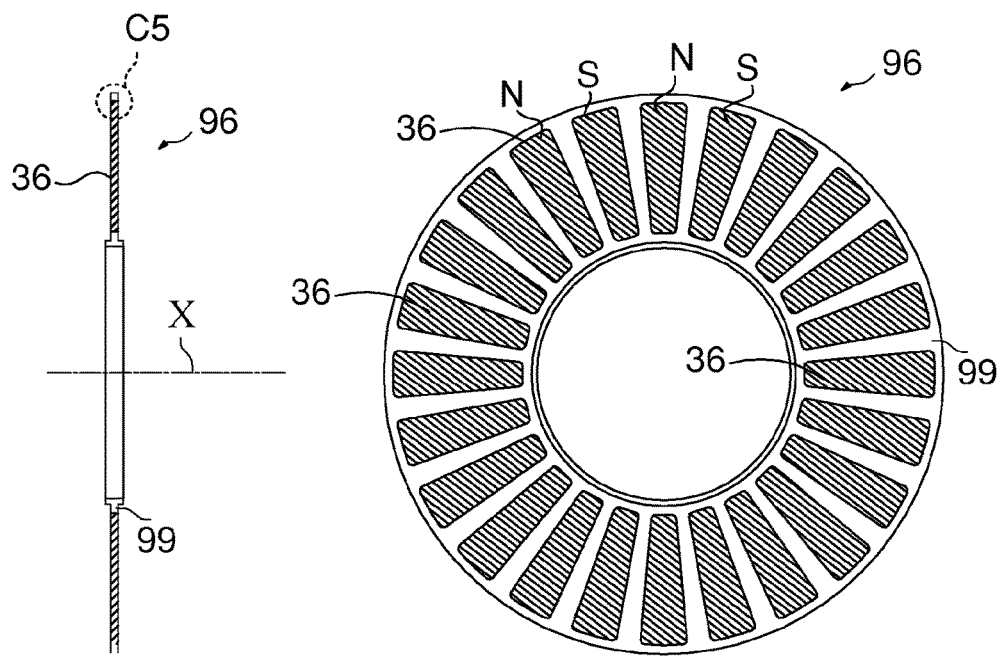
Fig. 8            Fig. 9
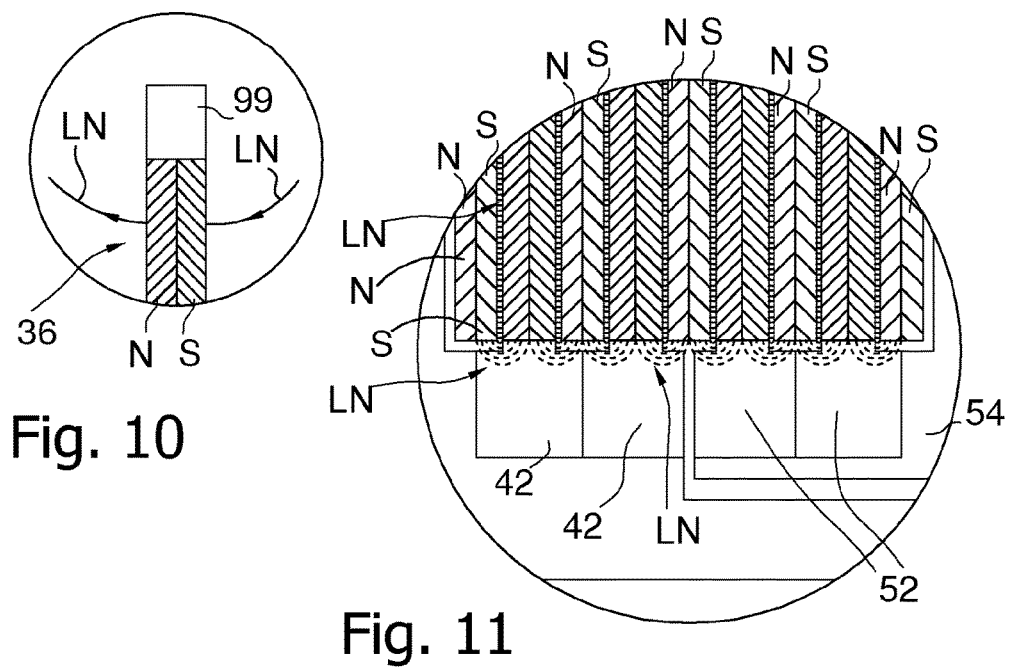
Fig. 10
Fig. 11

TRACTION AND SUSPENSION SYSTEM

The invention refers—in general—to a traction and suspension system, in particular in electric vehicles.

When the wheel of a vehicle travels on rough terrain and encounters a hole or some deformation of the road surface, it loses adhesion and is lifted from the ground irregularly. The suspension must counteract this effect, and the dampers absorb the bounce/oscillation of the suspension.

The nature of electric vehicles allows a greater simplification thereof, so much so that in the latest generations traction has been moved directly into the wheels, and consequently the weight of the wheel has increased (to about 30 Kg) while that of the vehicle overall can be even lower.

Since the elastic force of the suspension is about the weight of the vehicle divided by the number of wheels, the dynamic behavior of the wheel is less controlled because the suspension must act on a greater mass. Some manufacturers regain stability by adding a linear drive in parallel to or in place of the suspension, but it seems inadequate to solve the problem by increasing the complexity (especially in the control) when the initial goal was and will always reduce it.

It is desired then obviate to one or more of these problems, with a system and/or method according to the appended claims, in which the dependent ones define advantageous variants.

In particular it is presented a suspension system for a vehicle with a frame, comprising an element propulsive by rolling on the ground (e.g. a wheel or caterpillar);

two units, adapted to impart a torque to the propulsive element, that are controllable independently of one another, wherein the two units are movable relative to the propulsive element independently from one another and rigidly connectable to the frame (or to the vehicle body) at one same point, so that by moving one or each unit relative to the propulsive (or rolling) element the distance between the latter and said point varies.

This assembly (see FIG. 2) allows to use the two units both for transferring torque to the propulsive element and for adjusting the level or distance (e.g. with respect to ground or to the propulsive element) of the frame. This results in great compactness, high power density, mechanical simplification and therefore reliability, less weight and bulk. Also one gets rid of an auxiliary drive, which does not generate torque, to adjust such level. Other important advantages of the system are that it allows to equip the vehicle with active suspensions, able to adapt distribution of the vehicle to the road and driving conditions, and that it is easily integrated to the most common suspension standards thereby allowing its installation on both new and existing vehicles.

The system also works when the propulsive element is still, thanks to the reaction forces to the torque exerted by the units. To transform the system into a traction system it is enough that the torque exerted by the two units to the rolling element has the same directions.

The units being movable with respect to propulsive element, one can adjust their position relative to the latter, e.g. through control of the torque exerted by each unit on the propulsive element or by an auxiliary positioning device. Adjusting the position of one or each unit translates into an adjustment of the position or level of said point, and thus of the frame.

Preferably one or each unit is rotatably coupled to the propulsive element so as to be able to move around the rotation axis of the latter.

This solution allows the compact integration of the system inside a wheel and accomplishes a simple and balanced coupling to the propulsive element, in particular when the units are arranged substantially symmetrically with respect to a (in use e.g. vertical) plan passing through said rotation axis (or on opposite sides of the wheel).

Preferably one or each unit comprises an electric motor, a means being compact and easily integrated e.g. in a wheel. To realize the electric motor, preferably one or each unit comprises an electric winding adapted to cooperate with a magnetic part mounted on the propulsive element, or vice versa, in order to generate a torque by electromagnetic induction. In particular, the magnetic part is mounted radially in comb-arrangement around said rotation axis and the winding can be arranged in comb-arrangement between the magnets, in interdigitated manner. This configuration ensures compactness, high torque transfer and density, low leakage flux and a forced cooling of the windings.

Preferably the winding of one or each unit is integral with a bell-shaped element connected via a rigid arm to said point.

To control the level of the said point, one or each unit (or the system) comprise an electronic circuit adapted to drive the winding of the unit and to adjust the angular position thereof around the propulsive element. Thus the magneto-electric structure of the motor is exploited to make it perform also the function of positioning the units. E.g. by an inverter and associated feedback loops one can both control the torque and the position of an electric rotor.

It is also proposed a method for varying the distance of a frame of a vehicle from a rolling-on-the-ground propulsive element of its, wherein a torque is imparted on the propulsive element at two distinct points which are rigidly connected to the frame, the position of the two points, with respect to the propulsive element, is varied.

The variants described herein for the system are also variants of phases of the method, and for brevity they will not be repeated. The same applies to the advantages of the method.

The advantages of the invention will be more apparent from the following description of a preferred embodiment of a driving wheel, making reference to the attached drawing wherein FIGS. 1 and 2 show a diagram of the principle;

FIG. 5 shows a vertical cross-section along the plane V-V of FIG. 4;

FIG. 6 shows a three-dimensional view of the wheel of FIG. 4.

FIG. 7 shows isolated components of the vertical cross-section in FIG. 4;

FIG. 8 shows a side view of a stator;

FIG. 9 shows a front view of the stator of FIG. 8;

FIG. 10 shows an enlarged view of the circle C5 of FIG. 8;

FIG. 11 shows an enlarged view of the circle C6 in FIG. 7.

In the figures, identical numbers indicate identical or conceptually similar parts.

Figure 1:
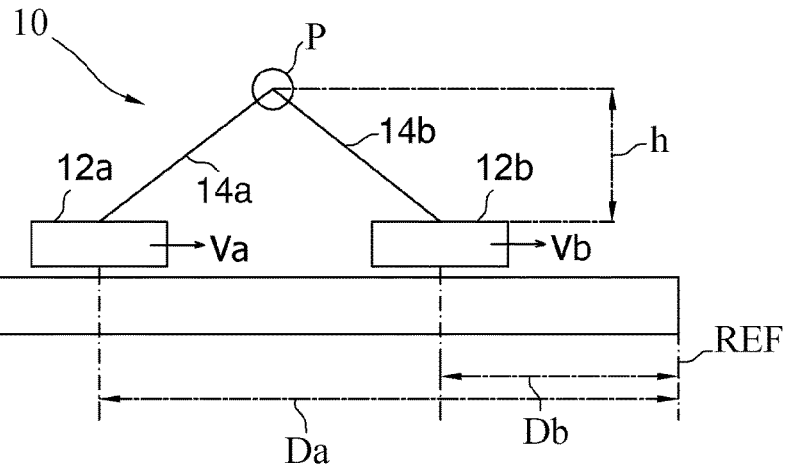

To understand the operation of the invention the basic principle is demonstrated in FIG. 1. The system 10 comprises a track 12 on which and with respect to which two units 12a, 12b can slide with relevant speeds va, vb. The track 12 has a zero reference REF, compared to which the units 12a, 12b are respectively distanced by a distance Da, Db. The speed va, vb and/or distances Da, Db are independently adjustable by a control (not shown).

Each unit 12a, 12b is connected to one same point P by means of respective rigid arms 14a, 14b. The point P is at a level h with respect to the units 12a, 12b.

When the speeds va, vb are not equal, the speed differential will make the units 12a, 12b get closer or further on the track 12, and consequently the level h varies. Therefore, by controlling the speeds va, vb and/or the distances Da, Db, one can control the level h.

Note that in system 10 the control of the level h is independent of (i) the possible motion of the track 12 relative to the observer and (ii) of the type of contact between the units 12a, 12b and the track 12 (e.g. sliding or rolling contact or any).

Figure 2:
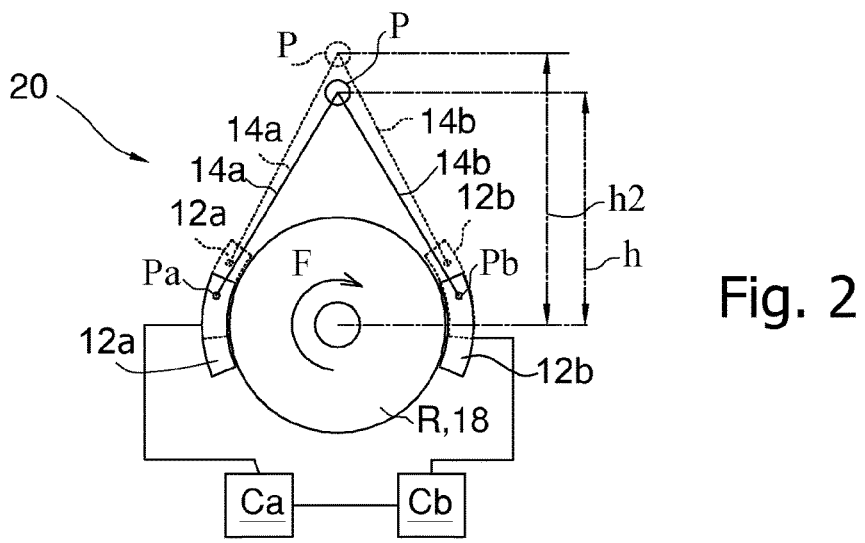

Imagining now to wrap circularly on itself the track 12, one obtains the system 20 of FIG. 2. The track 12 has become a wheel or rim R of a vehicle, and on it there are mounted two units 12a, 12b adapted to impart to the wheel R, independently of one another, a torque, e.g. an equidirectional torque to make it rotate (see arrow F). The units 12a, 12b are independently rotatable about the axis of the wheel R and hinged, at points Pa, Pb, with rigid arms 14a, 14b that converge to a single point P integral with the frame of the vehicle and with level h with respect to the axis of the wheel R.

Two controllers Ca, Cb drive and operate independently the torque imposed by each unit 12a, 12b to the wheel R, and thus also the angular position of each unit 12a, 12b.

By controlling the torque and/or controlling the position of the units 12a, 12b relative to the wheel R, the controllers Ca, Cb can not only determine the speed of the wheel R, but also the relative position of the units 12a, 12b, and thus the level h. A different location at a level h2 of the point P, when the units 12a, 12b have moved closer to each other, is shown with a dotted line.

Note that in system 20 the control of the level h is independent
of the motion of the wheel R, and
of the way the units 12a, 12b transfer torque to the wheel R (they could comprise gears in engagement with a toothing on the wheel R or belts, plungers as in a steam train, or magnetic or electrostatic attraction or repulsion means).

Another advantage of the scheme of FIG. 2 is that the reaction forces on the units 12a, 12b that are transmitted on the arms 14a, 14b have opposite directions, so they cancel out at point P. Thus each unit 12a, 12b can impart torque on the wheel R, 12 without creating instability or internal tensions.

Figure 3:
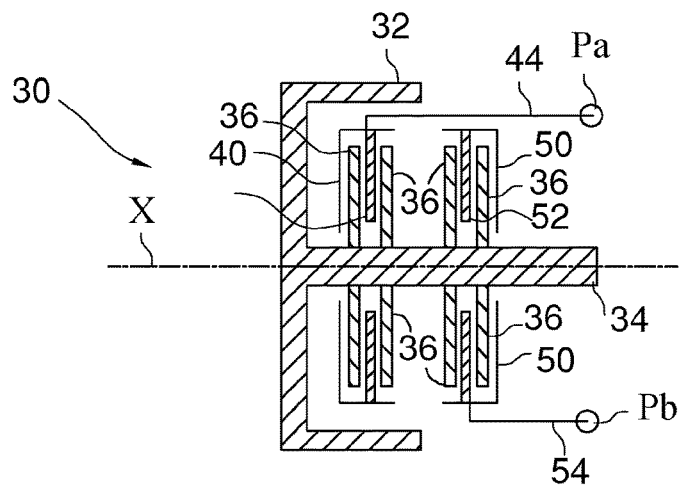
FIG. 3 shows a simplified diagram of a driving wheel.

To integrate the system 20 in an electric vehicle, where the traction is localized in the wheels, one can use advantageously the scheme of wheel 30 of FIG. 3.

A rim 32 can rotate about an axis X and has a central hub 34 from which magnets 36 extend radially, arranged in a comb-like manner, whose field lines from the pole N to S are parallel to the axis X. Around the hub 34 there are mounted, rotatable about the axis X independently from one another, two circular bells 40, 50 that carry windings 42, 52 arranged in interdigitated manner with the magnets 36.

The windings 42, 52 are supplied by independent inverters (not shown and mounted on the bells 40, 50) and form with the magnets 36 the structure of an electric motor, preferably that of a ironless linear motor circularly closed on itself. Via the inverters each bell 40, 50 and associated windings 42, 52 is able to impart a torque on the hub 34 through the magnetic reaction on the magnets 36. The torque impressed by each inverter is controlled independently, and each inverter has known signals and positional feedback circuits that also allow to control the angular position of each bell 40, 50 about the axis X.

Each bell 40, 50 is integral with a rigid element 44, 54 that comes out of the wheel 30 and is connected, at points Pa, Pb, to rigid arms equal to the arms 14a, 14b of FIG. 2.

Therefore it is understood that the structure of FIG. 3 is a compact realization and fully integrated in the wheel of the diagram of FIG. 2.

FIGS. 4-7 show a constructive example of the motorized wheel or equivalent element being propulsive by rolling on the ground.

Figure 4:
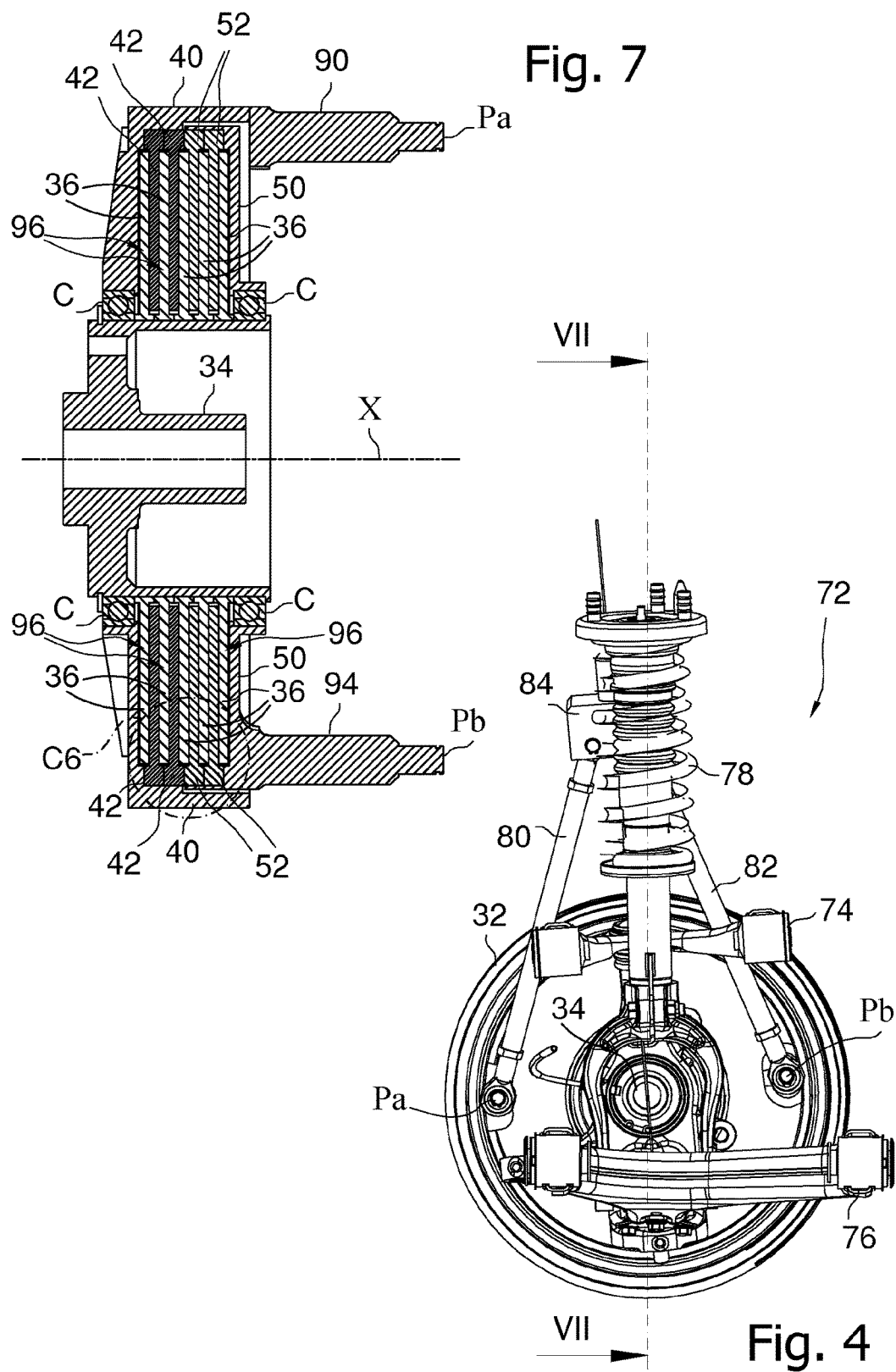
FIG. 4 shows a front view of a driving wheel.

FIG. 4 illustrates e.g. the reduction into practice of the diagram of FIG. 3, and for simplicity's sake it maintains the same numerical references for the parts being conceptually similar. In FIG. 4 one can appreciate five magnets or magnetic rings 36 fixed to the hub 34 and arranged in comb formation, and between the magnets 36 there are four annular windings: two indicated by 42 that extend from a first bell 40, and two indicated by 52 which extend from a second bell 50. The windings 42, 52 are arranged on planes parallel to each other and radially with respect to axis X.

In the figures bearings, indicated with C, are noticeable on which there are mounted the bells 40, 50 to make them rotatable about the axis X, relative to the hub 34, independently of one another. The bells 40,50 are e.g. discs with circular edges or rings to which the windings are integral.

Each bell 40, 50 extends towards the outside of the wheel, from the inner side toward a suspension 72 (see. FIGS. 5-7), with a respective pin 90, 94, on which there rests a respective rigid arm 80, 82 (see FIGS. 4-6) that has the function of the arms 14a, 14b. In fact, the arms 80, 82 converge toward and are fixed to a block 84, in turn fixed to the vehicle frame (not shown). The suspension 72 comprises a known fork 76 on the end of which is rotatably mounted the hub 34, held in place also by a second fork 74. A known damper 78 connects the fork 76 to the frame.

The windings 42, 52 cooperate with the magnets 36, as an electric motor, to impart an equidirectional torque to the hub 34, and then to a tire (not shown) that discharges it to the ground for advancing the vehicle. The windings 42, 52 are controllable independently of one another by means of e.g. inverters (not shown) or similar electronic circuits.

The position of the magnetic part of the wheel, the magnets 36, can be exchanged with the windings 42, 52.

The number of the magnets 36 and the windings 42, 52 may vary according to the desired power on the wheel.

FIGS. 8-9 show the structure of a stator 96 of the structure of the electric motor in FIG. 7; in particular it illustrates how the stator 96 houses a plurality of magnets 36 (only some shown). The magnets 36 are arranged along radial directions with respect to the axis X (and to the hub 34), and are supported in that way by a circular crown 99 which houses them in complementary pass-through openings so as to be exposed on two the opposite faces of the crown 99. Each magnet 36 is a plate whose major surfaces (orthogonal to the thickness) exhibit and are a seat for different magnetic poles. In other words the magnetic field lines LN come out from the magnet 36 approximately perpendicular to said major surfaces.

FIG. 10 shows by dashed lines the polarity of a magnet 36, where with N the north pole is indicated and with S the south pole (also in FIG. 11), and an exemplary magnetic field line LN is shown. The magnets 36 are so mounted that each face of the rotor 96 has magnets 36 which have a polarity opposite to the adjacent magnet 36. That is to say that travelling e.g. clockwise the circular crown 99, one meets a magnet 36 with a North Pole, then a magnet 36 with a South Pole, then a magnet 36 with a North Pole, and so on. FIG. 9 shows as an example the polar sequence for four magnets.

In FIG. 11 show the lines LN of magnetic field are shown that develop between the magnets 36 and the windings 42, 52.

A single winding 42, 52, in turn distributed over a circular crown, is placed rotatable between two stators 96. With respect to these two stators, on one side of the winding 42, 52 the field lines LN of an N pole of a magnet 36 mounted on a stator 96 converge and on an opposite side of the same winding 42, 52 the field lines LN of a S-pole of a magnet 36 present on the stator 96 converge.

As one can see the magnetic pack is very compact and the lines LN have little dispersion. This allows to have an electric motor with high power density and high torque, both for traction and braking, ideal advantage for a wheel with embedded driving apparatus.

The invention claimed is:

1. Suspension system for a vehicle with a frame, comprising:
    an element propulsive by rolling on the ground; and
    two units adapted to impart a torque to said propulsive element in the same rotation direction to make the propulsive element rotate about a rotation axis for advancing the vehicle, said units being independently movable relative to the propulsive element and rigidly connected to the frame at a common point, the torque imparted by each unit being controllable independently of one another,
    so that upon a controlled impartation of torque by each of said units, one or both of said units can move relative to the propulsive element thereby causing a distance between said propulsive element and said point on the frame to vary.

2. System according to claim 1, wherein one or each unit is rotatably coupled to the propulsive element so as to be able to move around the rotation axis.

3. System according to claim 1, wherein one or each unit comprises an electric motor.

4. System according to claim 1, wherein one or each unit comprises an electric winding adapted to cooperate with a magnetic part mounted on the propulsive element, or vice versa, in order to generate a torque by electromagnetic induction.

5. System according to claim 4, wherein the magnetic part is mounted radially in comb-arrangement around said rotation axis and the winding is arranged in comb-arrangement between the magnets, in interdigitated manner.

6. System according to claim 4, wherein the winding of one or each unit is integral with a bell-shaped element connected via a rigid arm to said point.

7. System according to claim 4, comprising, for one or each unit, an electronic circuit adapted to drive the winding thereof and adjust the angular position around the propulsive element.

8. System according to claim 1, wherein the units are arranged substantially symmetrically with respect to the rotation axis of the propulsive element.

9. System according to claim 2, wherein the units are arranged substantially symmetrically with respect to a plane passing through said rotation axis.

10. System according to claim 9, wherein said plane is, in use, vertical.

11. Method for varying the distance of a frame of a vehicle from a rolling-on-the-ground propulsive element of the vehicle, comprising:
    by two units, imparting a torque on the propulsive element in the same rotation direction to make the propulsive element rotate about a rotation axis for advancing the vehicle, said units being independently movable relative to the propulsive element and rigidly connected to the frame at a common point, the torque imparted by each unit being controllable independently of one another; and
    responsive to a controlled impartation of torque by each of said units, moving one or both of said units relative to the propulsive element, thereby causing the distance between the propulsive element and the frame to vary.

* * * * *